US012601126B2

(12) United States Patent
Graham et al.

(10) Patent No.: US 12,601,126 B2
(45) Date of Patent: Apr. 14, 2026

(54) HYBRID POWERTRAIN FOR PLANER

(71) Applicant: Caterpillar Paving Products Inc.,
Brooklyn Park, MN (US)

(72) Inventors: Luke E. Graham, Missoula, MT (US);
Brian J. Schlenker, Shoreview, MN
(US); Toby A. Frelich, Saint Michael,
MN (US)

(73) Assignee: Caterpillar Paving Products Inc.,
Brooklyn Park, MN (US)

( * ) Notice: Subject to any disclaimer, the term of this
patent is extended or adjusted under 35
U.S.C. 154(b) by 160 days.

(21) Appl. No.: 18/475,606

(22) Filed: Sep. 27, 2023

(65) Prior Publication Data

US 2025/0100539 A1 Mar. 27, 2025

(51) Int. Cl.
| | |
|---|---|
| *E01C 23/088* | (2006.01) |
| *B60W 20/15* | (2016.01) |
| *E01C 23/12* | (2006.01) |
| *B60K 25/00* | (2006.01) |

(52) U.S. Cl.
CPC ........... *E01C 23/088* (2013.01); *B60W 20/15*
(2016.01); *E01C 23/127* (2013.01); *B60K*
*2025/005* (2013.01)

(58) Field of Classification Search
CPC ...... E01C 23/085; E01C 23/088; E01C 23/12;
E01C 23/127; B60W 20/15
USPC ........................ 299/1.4, 1.5, 1.8, 34.07, 39.1
See application file for complete search history.

(56) References Cited

U.S. PATENT DOCUMENTS

| | | | |
|---|---|---|---|
| 8,585,317 B1 | 11/2013 | Sina | |
| 8,636,442 B1 | 1/2014 | Sopko, Jr. et al. | |
| 9,091,030 B2 | 7/2015 | Kleiger | |
| 10,094,078 B2 | 10/2018 | Husar | |
| 11,460,052 B2 * | 10/2022 | Schlenker | E01C 23/088 |
| 11,821,152 B2 * | 11/2023 | Repiscak | E01C 23/065 |
| 2014/0183003 A1 | 7/2014 | Jorgensen et al. | |
| 2016/0289005 A1 | 10/2016 | Hirman et al. | |
| 2016/0340841 A1 | 11/2016 | Krolnik et al. | |
| 2018/0135257 A1 | 5/2018 | Schlenker et al. | |

(Continued)

FOREIGN PATENT DOCUMENTS

| | | | |
|---|---|---|---|
| CN | 209211229 | 8/2019 | |
| CN | 113147720 A * | 7/2021 | B60L 50/61 |

(Continued)

*Primary Examiner* — Frederick L Lagman

(57) ABSTRACT

A hybrid powertrain system of a planer, the hybrid powertrain system comprising an internal combustion engine, a rotor/cutter mechanically coupled with the internal combustion engine, a generator mechanically coupled with the internal combustion engine, an energy storage system including an energy module having at least one energy storage cell, wherein the energy module is electrically coupled with the generator and configured to receive power from and be charged by the generator, an electric motor in electrical communication with the energy module, the electric motor mechanically coupled with the rotor/cutter, and a powertrain controller in electrical communication with the internal combustion engine and the energy storage system. The powertrain controller is configured for controlling delivery of electrical power from the energy storage system to the rotor/cutter while controlling delivery of mechanical power from the internal combustion engine to the rotor/cutter.

20 Claims, 4 Drawing Sheets

(56) References Cited

U.S. PATENT DOCUMENTS

| | | | |
|---|---|---|---|
| 2020/0049089 A1* | 2/2020 | Charbonnel | G05B 17/02 |
| 2020/0164734 A1 | 5/2020 | David et al. | |
| 2021/0148063 A1* | 5/2021 | Repiscak | E01C 23/065 |
| 2021/0231134 A1* | 7/2021 | Schlenker | B60G 21/067 |
| 2022/0220703 A1 | 7/2022 | Mckinzie | |
| 2022/0389666 A1 | 12/2022 | Farr et al. | |
| 2024/0375636 A1* | 11/2024 | Nelson | B60W 20/13 |

FOREIGN PATENT DOCUMENTS

| | | | |
|---|---|---|---|
| CN | 114508027 A | * | 5/2022 |
| GB | 1346031 | | 2/1974 |

* cited by examiner

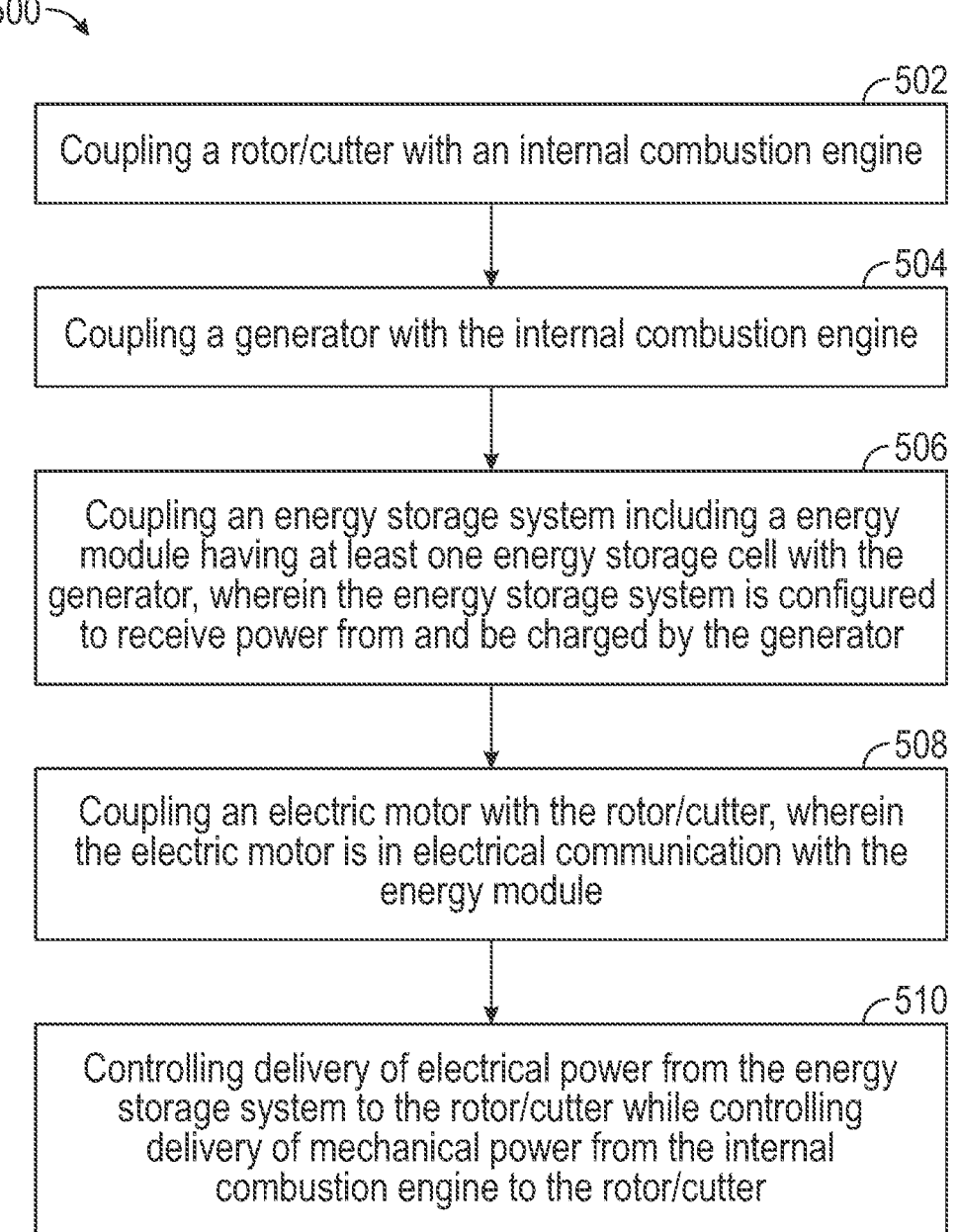

500

502

Coupling a rotor/cutter with an internal combustion engine

504

Coupling a generator with the internal combustion engine

506

Coupling an energy storage system including a energy module having at least one energy storage cell with the generator, wherein the energy storage system is configured to receive power from and be charged by the generator

508

Coupling an electric motor with the rotor/cutter, wherein the electric motor is in electrical communication with the energy module

510

Controlling delivery of electrical power from the energy storage system to the rotor/cutter while controlling delivery of mechanical power from the internal combustion engine to the rotor/cutter

FIG. 5

HYBRID POWERTRAIN FOR PLANER

TECHNICAL FIELD

This disclosure relates generally to powertrains and, for example, to control of a hybrid powertrain system.

BACKGROUND

Internal combustion engines may be used to power different devices and/or machines. Internal combustion engines provide reliable power. However, internal combustion engines are associated with several drawbacks. For example, emissions from internal combustion engines may impact the environment and/or human health. Furthermore, internal combustion engines may be associated with high fuel costs, as fuel is consumed continuously while an internal combustion engine is operating, even during idling or waiting times. As another example, internal combustion engines produce a high level of noise. The noise produced by an internal combustion engine can be a nuisance, and in particular, may obstruct communication among a work crew for a machine that uses the internal combustion engine.

U.S. Pat. No. 8,585,317 describes a vibratory roller machine includes a chassis supported on one or more drum assemblies including an exciter assembly for compacting the ground on which the machine travels. The machine is operated via a number of drive and exciter motors powered by a series hybrid drive system. The series hybrid drive system includes an engine and generator that are configured to provide power to the system under nominal operating conditions. The series hybrid drive system further includes a power storage system, such as battery bank or a capacitor bank that is configured to provide the motors with additional power during peak power demand. The vibratory roller machine may, for example, be a walk-behind trench roller or ride-on roller.

US20220389666 describes a paving machine including a powertrain with a power unit. The power unit may include a diesel generator and a battery. The powertrain may also include one or more drivetrains. The drivetrains may include a hydraulic drivetrain and an electric drivetrain. The drivetrains may receive power from the power unit for supplying power to actuators of the hydraulic drivetrain and the electric drivetrain. The paving machine may be a curb-forming machine including the battery, the hydraulic drivetrain, and the electric drivetrain. The hydraulic drivetrain of the curb-forming machine may include a cylinder, crawler, steering assembly, and auger, and the electric drivetrain may include a vibrator. The paving machine may also include a number of other types of paving machines. Where the paving machine includes the hydraulic drivetrain, a buffer may be provided to ensure sufficient hydraulic power in response to demand changes.

SUMMARY

This disclosure is directed to a hybrid powertrain system to offset the machine power requirements. In some examples, the hybrid powertrain system includes a motor-generator positioned within an existing driveline. This hybrid powertrain system may also remove the hydraulic pumps from the mechanical driveline and power them only via an electric motor.

In some aspects, this disclosure is directed to a hybrid powertrain system of a planer, the hybrid powertrain system comprising: an internal combustion engine; a rotor/cutter mechanically coupled with the internal combustion engine; a generator mechanically coupled with the internal combustion engine; an energy storage system including an energy module having at least one energy storage cell, wherein the energy module is electrically coupled with the generator and configured to receive power from and be charged by the generator; an electric motor in electrical communication with the energy module, the electric motor mechanically coupled with the rotor/cutter; and a powertrain controller in electrical communication with the internal combustion engine and the energy storage system, the powertrain controller configured for: controlling delivery of electrical power from the energy storage system to the rotor/cutter while controlling delivery of mechanical power from the internal combustion engine to the rotor/cutter.

In some aspects, this disclosure is directed to a method of operating a hybrid powertrain system of a planer, the method comprising: coupling a rotor/cutter with an internal combustion engine; coupling a generator with the internal combustion engine; coupling an energy storage system including an energy module having at least one energy storage cell with the generator, wherein the energy storage system is configured to receive power from and be charged by the generator; coupling an electric motor with the rotor/cutter, wherein the electric motor is in electrical communication with the energy module; and controlling delivery of electrical power from the energy storage system to the rotor/cutter while controlling delivery of mechanical power from the internal combustion engine to the rotor/cutter.

In some aspects, this disclosure is directed to a powertrain controller for a hybrid powertrain system of a planer, the hybrid powertrain system in electrical communication with the internal combustion engine and the energy storage system, the controller comprising: one or more processors configured for: controlling delivery of electrical power from the energy storage system to a rotor/cutter of the hybrid powertrain system while controlling delivery of mechanical power from the internal combustion engine to the rotor/cutter.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 is a flow diagram depicting an example of a method of operating a hybrid powertrain system of a planer, such as the planer for FIG. 1.

DETAILED DESCRIPTION

Currently, machine engine ratings, such as for cold planer or reclaimer mixer machines, are selected to handle the power needs of the hydraulic systems (propel, auxiliary, conveyors, spray systems, etc.) and a diesel combustion engine driven rotor drive for worst case applications. The duty cycle of the machine often includes a large percentage of idle time and lower power draw.

The present inventors have recognized a need to include a hybrid powertrain system to offset the machine power requirements. In some examples, the hybrid powertrain system includes a motor-generator positioned within an existing driveline. This hybrid powertrain system may also remove the hydraulic pumps from the mechanical driveline and power them only via an electric motor.

This hybrid powertrain system may allow for smaller engines and/or lower power ratings to be utilized. The energy storage charging may be done while monitoring the load required by the machine powertrain (including the rotor driveline), which may allow the energy cells, e.g., batteries or capacitors, to be charged during idle time or when less power is required by the application.

Figure 1:
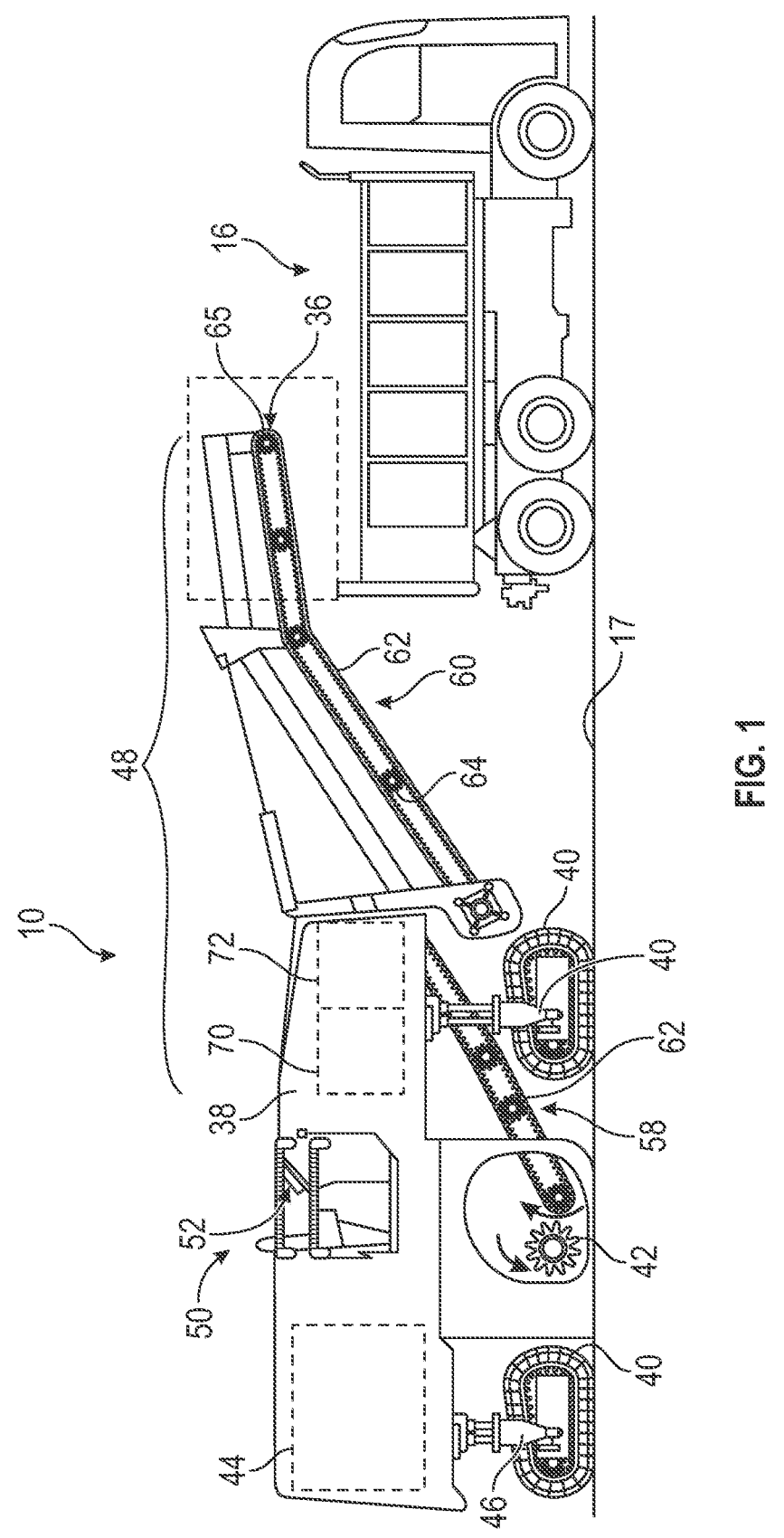
FIG. 1 is a side elevational view of an example of a machine that can implement various techniques of this disclosure.

FIG. 1 is a side elevational view of an example of a machine that can implement various techniques of this disclosure. FIG. 1 shows an example where the machine 10 is a pavement recycling machine, such as a cold planer. However, as described above, the machine 10 may be any machine that includes a hybrid powertrain system.

FIG. 1 illustrates a cold planer 10 having a frame 38 supported by one or more traction devices 40, a rotor/cutter 42 rotationally supported under a belly of the frame 38, and an internal combustion engine 44 mounted within the frame 38 and configured to drive the rotor/cutter 42 and traction devices 40. Traction devices 40 may include either wheels or tracks connected to actuators 46 that are adapted to controllably raise and lower the frame 38 relative to a ground surface. It should be noted that in the example shown in FIG. 1, raising and lowering of the frame 38 may also function to vary a milling depth of the rotor/cutter 42 into surface to be removed 17. In some examples, the same or different actuators 46 may also be used to steer the cold planer 10 and or to adjust a travel speed of the traction devices 40 (e.g., to speed up or brake traction devices 40), if desired. A conveyor system 48 may be pivotally connected at a leading end to frame 38 and configured to transport material away from rotor/cutter 42 and into a receptacle, such as a haul vehicle 16.

The frame 38 may also support an operator station 50. The operator station 50 may house any number of interface devices 52 used to control the cold planer 10. In the disclosed example, the interface devices 52 may include, among other things, a display and one or more other analog and/or digital input devices. In other examples, the operator station 50 may be offboard the cold planer 10. For example, the operator station 50 may embody a tethered or remote control, such as a handheld controller, that an operator may use to control the cold planer 10 from anywhere on or near a worksite. The operator station 50 may alternatively embody a software program and user interface for a computer and may include a combination of hardware and software. In other embodiments, the cold planer 10 may be autonomous and may not include the operator station 50.

The display of interface devices 52 may be configured to render the location of the cold planer 10 (e.g., of rotor/cutter 42) relative to features of the jobsite (e.g., milled and/or unmilled parts of the surface 17), and to display data and/or other information to the operator. The interface devices 52 may be configured to receive data and/or control instructions from the operator of cold planer 10. Other interface devices (e.g., control devices) may also be possible, and one or more of the interface devices described above could be combined into a single interface device, if desired.

An example of the interface device 52 may be, for example, an analog input device that receives control instructions via one or more buttons, switches, dials, levers, etc. The interface devices 52 may also or alternatively include digital components, such as one or more soft keys, touch screens, and/or visual displays. Interface devices may be configured to generate one or more signals indicative of various parameters associated with the cold planer 10 and/or its surrounding environment based on input received from the operator. For example, an interface device may be configured to receive inputs indicative of milled material density p, a material ID (i.e., a type of material being milled), and parameters of the haul vehicle 16 (e.g., dimensions, volume capacity, weight capacity, legal weight limit etc.). The interface device 52 may also be configured to allow the operator to indicate when a receptacle is empty or full, for example, by pressing a button associated with the interface device 52. The information received via the interface device 52 may be sent to and/or stored in a memory of a controller and used for further processing.

The conveyor system 48 may include a first (primary) conveyor 58 adjacent the rotor/cutter 42 that is configured to transfer milled material to a second (secondary) conveyor 60. The conveyors 58 and 60 may each include a conveyor belt 62 that is supported on a plurality of roller assemblies 64, including a belt head roller assembly 65 at a distal end of the conveyor 60, and driven by a motor. A conveyor frame may include structural members welded or otherwise joined together to form support trusses that make up the backbone of each conveyor belt assembly, supporting multiple roller assemblies 64 and a conveyor belt 62. The motor may embody, for example, a hydraulic motor powered by a hydraulic system (not shown). In other embodiments, the motor may be an electric motor or another type of motor. The motor may be powered by the internal combustion engine 44 or by another power source.

In accordance with this disclosure, the cold planar 10 can include a hybrid powertrain system. The hybrid powertrain system is shown in detail in FIG. 2 and can include an energy storage system 70 including an energy module having at least one energy storage cell and an electric motor 72 in electrical communication with the energy module and mechanically coupled with the rotor/cutter 42. The energy module may include batteries or capacitors, for example, to store energy.

As indicated above, FIG. 1 is provided as an example. Other examples may differ from what is described with regard to FIG. 1.

Figure 2:
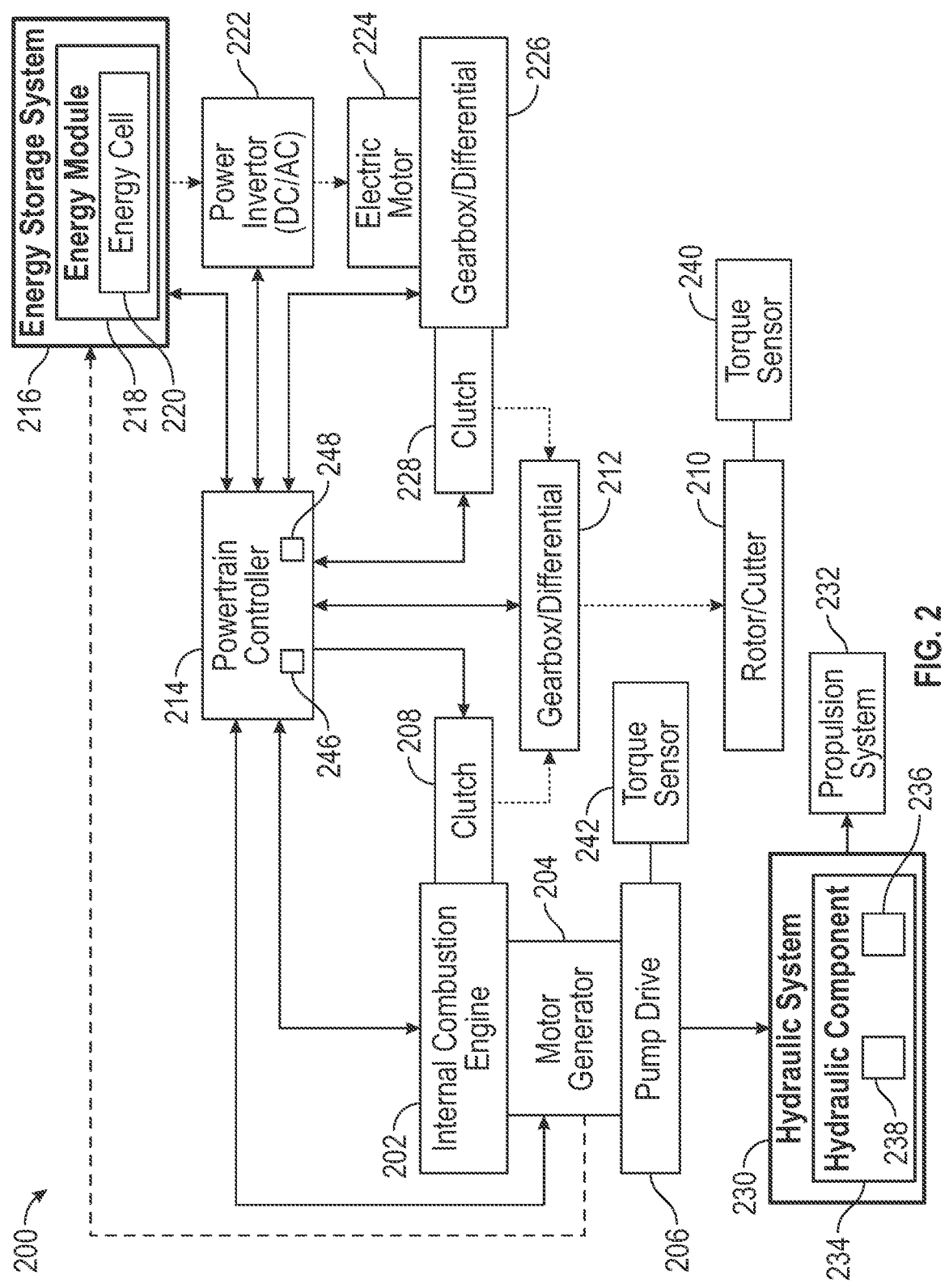
FIG. 2 is a diagram of an example of a hybrid powertrain system in accordance with this disclosure.

FIG. 2 is a diagram of an example of a hybrid powertrain system in accordance with this disclosure. The hybrid powertrain system 200 of FIG. 2 includes an internal combustion engine 202, such as the internal combustion engine 44 of FIG. 1. A motor-generator 204, such a flywheel integrated generator, is mechanically coupled with the internal combustion engine 202 and with a pump drive 206. The pump drive 206 drives the hydraulic system 230, such as for the main propulsion system, conveyor system, and other auxiliary functions of the cold planer 10 of FIG. 1.

The internal combustion engine 202 is coupled with a clutch 208 that drives the rotor/cutter 210, such as the rotor/cutter 42 of FIG. 1, via a gearbox/differential 212. In this manner, the rotor/cutter 210 is mechanically coupled with the internal combustion engine 202. The mechanical coupling provides a direct drive connection from the engine output to the rotor/cutter.

A powertrain controller 214 is in electrical communication with the internal combustion engine 202, the motor-generator 204, the clutch 208, and the gearbox/differential 212. The powertrain controller 214 can include at least one memory device 246 and at least one processor 248. The memory device 246 can story instructions for execution by the processor(s) 248. The powertrain controller 214 coordinates and controls the operation of these components. In the configuration shown in FIG. 2, the pump drive 206 and the rotor/cutter 210 are coupled in parallel.

The hybrid powertrain system 200 further includes an energy storage system 216. The energy storage system 216 includes an energy module 218 having at least one energy storage cell 220. Examples of the energy storage cells include battery cells or capacitor cells. The energy module 218 may include controllers and/or other circuitry to monitor a state of charge, a state of health, and other parameters of the energy storage cells. Monitoring these parameters allows improved control and usage of the energy storage system.

The energy storage system 216 is coupled with a power inverter 222 (DC/AC). The power inverter 222 converts the DC power from the energy storage system into AC power to supply an electric motor 224. The electric motor 224 is mechanically coupled with the rotor/cutter 210 via a gearbox/differential 226, a clutch 228, and the gearbox/differential 212. The gearbox/differential 226 provides speed matching between the electric motor and the main rotor/cutter drive. This allows the hybrid powertrain system 200 to integrate the electric motor power into the primary powertrain. In this manner, the electric motor 224 is in electrical communication with the energy module 218 and is also mechanically coupled with the rotor/cutter 210.

The powertrain controller 214 is in electrical communication with the energy storage system 216, the power inverter 222, the gearbox/differential 226, and the clutch 228. The powertrain controller 214 coordinates these components to control delivery of electrical power from the energy storage system 216 to the rotor/cutter 210 while also controlling delivery of mechanical power from the internal combustion engine 202 to the rotor/cutter 210.

By incorporating an energy module using batteries or capacitors to store energy, the hybrid powertrain system 200 allows the cold planer 10 of FIG. 1 to have an effectively higher horsepower rating without requiring a larger internal combustion engine. This can be achieved by using the stored energy in the energy module to provide a power boost to the rotor drive 210 when needed, such as when the cold planer is performing a demanding cut using the rotor/cutter 210, exceeding the power capability of the internal combustion engine 202.

In some examples, the powertrain controller 214 is configured for controlling delivery of the electrical power to the pump drive 206 while terminating delivery of the mechanical power via the internal combustion engine 202. In such examples, the energy module 218 acts as a pure electric power source for the hydraulic system 230 coupled with the propulsion system 232, conveyor system, and other auxiliary hydraulic functions of the cold planer 10. This allows the internal combustion engine 202 to be turned off or de-rated and the cold planer 10 to be maneuvered using only electric power from the energy module 218. Using electric power in this way provides fuel savings and reduces noise emissions compared to operating the internal combustion engine 202 to power the hydraulics hydraulic system 230.

In some examples, the powertrain controller 214 is configured for controlling delivery of mechanical power from the internal combustion engine 202 to the rotor/cutter 210 while controlling delivery of electrical power from the energy storage system 216 to the rotor/cutter 210. For example, the powertrain controller 214 can control delivery of both mechanical power and electrical power to the rotor/cutter 210.

In some examples, the powertrain controller 214 is configured for controlling delivery of electrical power to the rotor/cutter 210 while terminating delivery of mechanical power via the internal combustion engine 202. In some examples, the powertrain controller 214 is configured for controlling the motor-generator 204 to charge the energy module 218 while the internal combustion engine 202 is in operation at low engine load.

The hydraulic system 230 is mechanically coupled with the pump drive 206 and the hydraulic system 230 includes a hydraulic component 234, such as a hydraulic pump, and having a hydraulic fluid 236.

In some examples, the hybrid powertrain system 200 includes at least one sensor 238 configured to measure a characteristic of the hydraulic fluid 236. The powertrain controller 214 can calculate torque using flow and pressure data, such as flow and pressure data of hydraulic fluid. In some such examples, the powertrain controller 214 is configured for controlling delivery of the electrical power to the pump drive 206 while terminating delivery of the mechanical power via the internal combustion engine 202. For example, the powertrain controller 214 can be configured for receiving data representing the characteristic of the hydraulic fluid, calculating a torque based on the received data representing the characteristic of the hydraulic fluid, and using the calculated torque to control delivery of the electrical power to the pump drive 206 while terminating delivery of the mechanical power via the internal combustion engine 202.

In other examples, the hybrid powertrain system 200 includes a torque sensor 240 configured to measure an output torque of the rotor/cutter 210. In some such examples, the powertrain controller 214 is configured for controlling delivery of electrical power from the energy storage system 216 to the rotor/cutter 210 while controlling delivery of mechanical power from the internal combustion engine 202 to the rotor/cutter 210. The powertrain controller 214 is configured for receiving, via the torque sensor 240, data representing the output torque of the rotor/cutter 210 and using the received data to control delivery of electrical power from the energy storage system 216 to the rotor/cutter 210 while controlling delivery of mechanical power from the internal combustion engine 202 to the rotor/cutter 210, for the purpose of maintaining a consistent rotor output torque and thus cutting speed to maximize machine production and cutter pattern quality.

In some examples, the hybrid powertrain system 200 includes a torque sensor 242 configured to measure an output torque of the pump drive 206. In some such examples, the powertrain controller 214 is configured for controlling delivery of the electrical power to the pump drive 206 while terminating delivery of the mechanical power via the internal combustion engine 202. For example, the powertrain controller 214 is configured for receiving data representing a desired or commanded power output of the pump drive 206 and using the received data to control delivery of the electrical power to the pump drive 206 while terminating delivery of the mechanical power via the internal combustion engine 202.

Figure 3:
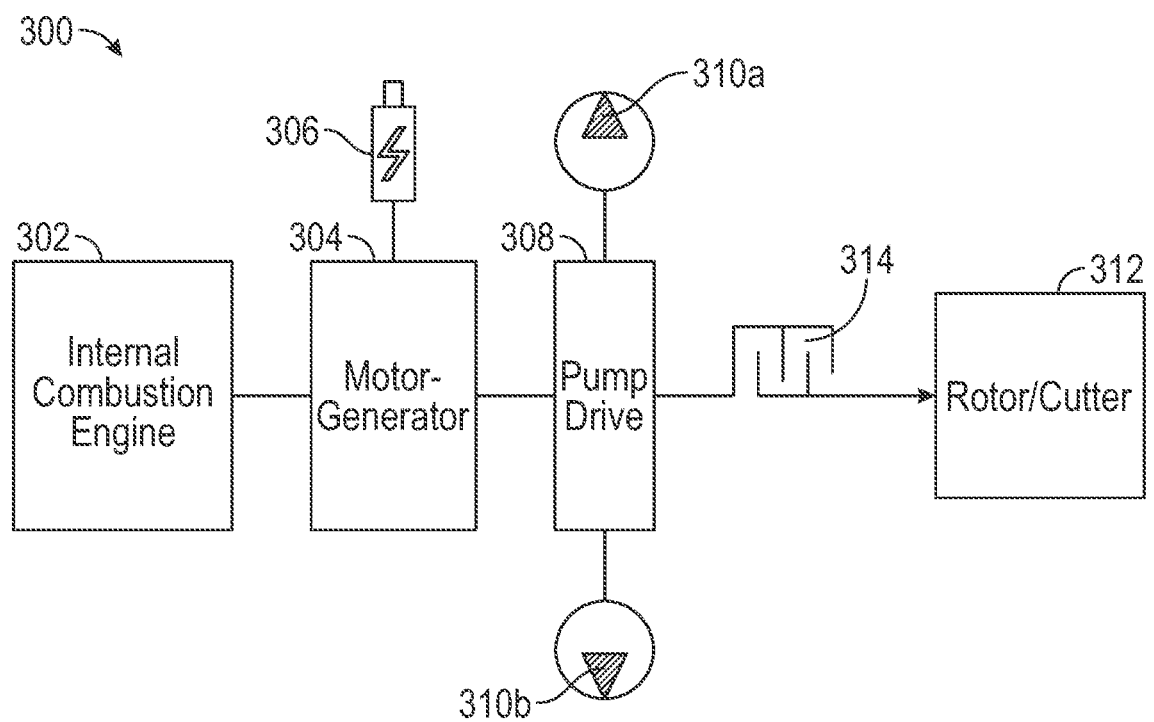
FIG. 3 is a simplified diagram of another example of a hybrid powertrain system in accordance with this disclosure.

FIG. 3 is a simplified diagram of another example of a hybrid powertrain system in accordance with this disclosure. The hybrid powertrain system 300 of FIG. 3 includes a series powertrain where an internal combustion engine 302 is connected in series with a motor-generator 304 (or starter-generator). The motor-generator 304 is electrically coupled with an energy storage system 306, such as the energy storage system 216 of FIG. 2. The energy storage system 306 can include one or more battery cells or capacitors, for example. The motor-generator 304 can function as motor to discharge the energy storage system 306 or as a generator to charge the energy storage system 306. The energy storage system 306 can draw power from and be charged by the internal combustion engine 302, or the energy storage system 306 can act as a secondary source of power to enhance the power delivered by the internal combustion engine 302.

A pump drive 308 is coupled with and configured to receive power from the motor-generator 304. One or more pumps, e.g., hydraulic pumps, such as pump 310a and pump 310b, can be coupled with the pump drive 308, e.g., a gearbox of the pump drive 308. The pump 310a and the pump 310b can form part of a hydraulic system, such as the hydraulic system 230 of FIG. 2.

The pump drive 308 and the rotor/cutter 312 are coupled in series via a clutch 314.

Figure 4:
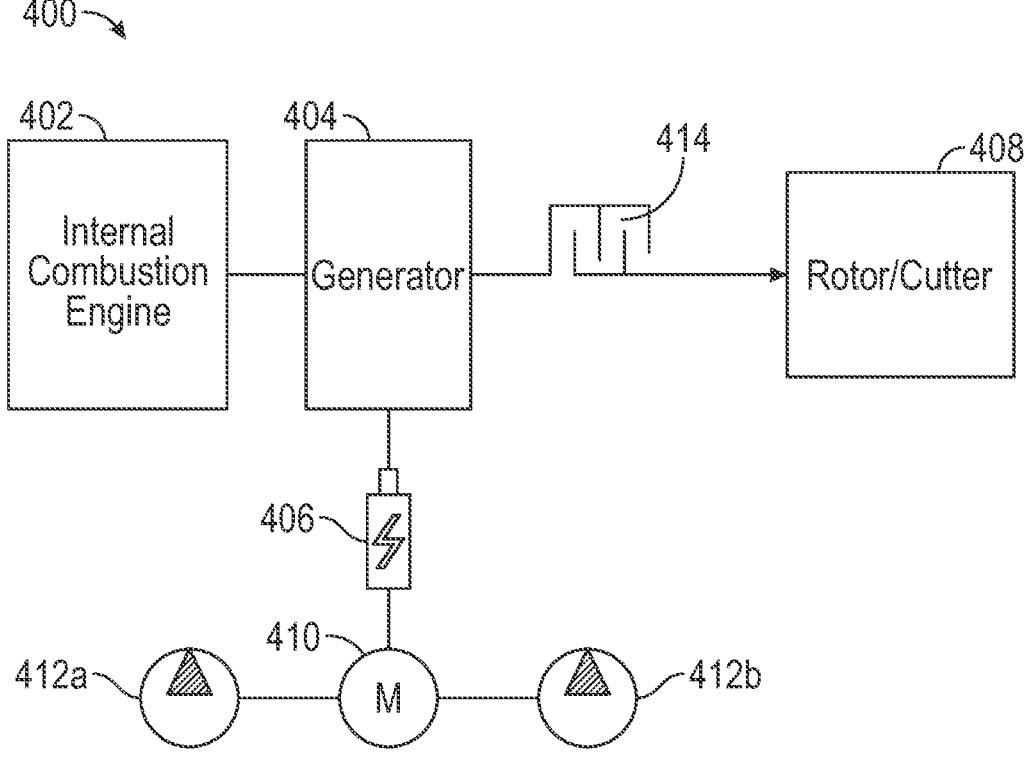
FIG. 4 is a simplified diagram of another example of a hybrid powertrain system in accordance with this disclosure.

FIG. 4 is a simplified diagram of another example of a hybrid powertrain system in accordance with this disclosure. The hybrid powertrain system 400 of FIG. 4 includes a parallel powertrain. An internal combustion engine 402 is mechanically coupled with a generator 404. The generator 404 is electrically coupled with an energy storage system 406, such as the energy storage system 216 of FIG. 2. The energy storage system 406 can include one or more battery cells or capacitors, for example.

In FIG. 4, the pump drive portion includes at least one electric motor 410 mechanically coupled with one or more pumps, e.g., hydraulic pumps, such as a pump 412a and a pump 412b. The pump 412a and the pump 412b can form part of a hydraulic system, such as the hydraulic system 230 of FIG. 2. The pump drive portion in this configuration can be run entirely using the electric power from the energy storage system 406. There is no direct mechanical coupling with the internal combustion engine 402.

The rotor/cutter 408 is coupled to the generator 404 via a clutch 414.

FIG. 5 is a flow diagram depicting an example of a method 500 of operating a hybrid powertrain system of a planer, such as the planer for FIG. 1. At block 502, the method 500 includes coupling a rotor/cutter with an internal combustion engine, such as coupling the rotor/cutter 210 to the internal combustion engine 202 of FIG. 2.

At block 504, the method 500 includes coupling a generator with the internal combustion engine, such as coupling the motor-generator 204 with the internal combustion engine 202 of FIG. 2.

At block 506, the method 500 includes coupling an energy storage system including a energy module having at least one energy storage cell with the generator, where the energy storage system is configured to receive power from and be charged by the generator. For example, FIG. 2 depicts the energy storage system 216 (having an energy module 218 having at least one energy storage cell 220) coupled with the motor-generator 204.

At block 508, the method 500 includes coupling an electric motor with the rotor/cutter, where the electric motor is in electrical communication with the energy module. For example, FIG. 2 depicts coupling the electric motor 224 with the rotor/cutter 210, where the electric motor 224 is in electrical communication with the energy module 218.

At block 510, the method 500 includes controlling delivery of electrical power from the energy storage system to the rotor/cutter while controlling delivery of mechanical power from the internal combustion engine to the rotor/cutter. For example, the powertrain controller 214 includes at least one memory device 246 storing instructions that can be executed by at least one processor 248 to control delivery of electrical power from the energy storage system 216 to the rotor/cutter 210 while controlling delivery of mechanical power from the internal combustion engine 202 to the rotor/cutter 210.

In some examples, the instructions stored on memory device 246 can cause the powertrain controller 214 to control delivery of the electrical power to the pump drive while terminating delivery of the mechanical power via the internal combustion engine.

In some examples, the instructions stored on memory device 246 can cause the powertrain controller 214 to receive data representing a total power of the pump drive, and use the received data representing the total power of the pump drive to control delivery of the electrical power to the pump drive while terminating delivery of the mechanical power via the internal combustion engine.

In some examples, the instructions stored on memory device 246 can cause the powertrain controller 214 to receive data representing the characteristic of the hydraulic fluid, calculate a torque based on the received data representing the characteristic of the hydraulic fluid, and use the calculated torque to control delivery of the electrical power to the pump drive while terminating delivery of the mechanical power via the internal combustion engine.

In some examples, the instructions stored on memory device 246 can cause the powertrain controller 214 to control delivery of both mechanical power and electrical power to the rotor/cutter.

In some examples, the instructions stored on memory device 246 can cause the powertrain controller 214 to control delivery of electrical power to the rotor/cutter while terminating delivery of mechanical power via the internal combustion engine.

In some examples, the instructions stored on memory device 246 can cause the powertrain controller 214 to control the generator to charge the energy module while the internal combustion engine is in operation.

INDUSTRIAL APPLICABILITY

This disclosure describes a hybrid powertrain system in an electric machine, such as a paving machine, that provides several industrially applicable improvements. By incorporating an energy module using batteries or capacitors to store energy, the techniques of this disclosure allow the paving machine to have an effectively higher horsepower rating without requiring a larger internal combustion engine. This is achieved by using the stored energy in the energy module to provide a power boost to the engine when needed, such as when the paving machine is performing a demanding cut.

Additionally, the energy module can act as a pure electric power source for the hydraulic system and propulsion system of the paving machine. This allows the engine to be turned off and the machine to be maneuvered using only electric power from the energy storage module. Using electric power in this way provides fuel savings and reduces noise emissions compared to operating the engine to power the hydraulics and propulsion.

Overall, the hybrid powertrain invention has industrial applicability by improving the performance and efficiency of electric machines such as paving machines. The ability to provide a power boost and to operate on pure electric power provides technological improvements over conventional engine-powered systems. These advantages make the invention well-suited for use in the construction and paving industries.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. A hybrid powertrain system of a planer, the hybrid powertrain system comprising:
an internal combustion engine;
a rotor/cutter mechanically coupled with the internal combustion engine;
a generator mechanically coupled with the internal combustion engine;
an energy storage system including an energy module having at least one energy storage cell, wherein the energy module is electrically coupled with the generator and configured to receive power from and be charged by the generator;
an electric motor in electrical communication with the energy module, the electric motor mechanically coupled with the rotor/cutter; and
a powertrain controller in electrical communication with the internal combustion engine and the energy storage system, the powertrain controller configured for:
controlling delivery of electrical power from the energy storage system to the rotor/cutter while controlling delivery of mechanical power from the internal combustion engine to the rotor/cutter.

2. The hybrid powertrain system of claim 1, wherein the generator is a motor-generator, further comprising:
a pump drive coupled with and configured to receive power from the motor-generator.

3. The hybrid powertrain system of claim 2, wherein the pump drive and the rotor/cutter are coupled in series.

4. The hybrid powertrain system of claim 2, wherein the powertrain controller is configured for:
controlling delivery of the electrical power to the pump drive while terminating delivery of the mechanical power via the internal combustion engine.

5. The hybrid powertrain system of claim 2, further comprising:

a torque sensor configured to measure an output torque of the pump drive,
wherein the powertrain controller configured for:
controlling delivery of the electrical power to the pump drive while terminating delivery of the mechanical power via the internal combustion engine is configured for:
receiving data representing a total power of the pump drive; and
using the received data representing the total power of the pump drive to control delivery of the electrical power to the pump drive while terminating delivery of the mechanical power via the internal combustion engine.

6. The hybrid powertrain system of claim 2, further comprising:
a hydraulic system mechanically coupled with the pump drive, wherein the hydraulic system includes a hydraulic component and a hydraulic fluid;
at least one sensor configured to measure a characteristic of the hydraulic fluid;
wherein the powertrain controller configured for:
controlling delivery of the electrical power to the pump drive while terminating delivery of the mechanical power via the internal combustion engine is configured for:
receiving data representing the characteristic of the hydraulic fluid;
calculating a torque based on the received data representing the characteristic of the hydraulic fluid; and
using the calculated torque to control delivery of the electrical power to the pump drive while terminating delivery of the mechanical power via the internal combustion engine.

7. The hybrid powertrain system of claim 1, further comprising:
a torque sensor configured to measure an output torque of the rotor/cutter,
wherein the powertrain controller configured for:
controlling delivery of electrical power from the energy storage system to the rotor/cutter while controlling delivery of mechanical power from the internal combustion engine to the rotor/cutter, and the powertrain controller is further configured for:
receiving data representing the output torque of the rotor/cutter; and
using the received data representing the output torque of the rotor/cutter to control delivery of electrical power from the energy storage system to the rotor/cutter while controlling delivery of mechanical power from the internal combustion engine to the rotor/cutter.

8. The hybrid powertrain system of claim 1, wherein the powertrain controller configured for:
controlling delivery of mechanical power from the internal combustion engine to the rotor/cutter while controlling delivery of electrical power from the energy storage system to the rotor/cutter is further configured for:
controlling delivery of both mechanical power and electrical power to the rotor/cutter.

9. The hybrid powertrain system of claim 1, wherein the powertrain controller is configured for:
controlling delivery of electrical power to the rotor/cutter while terminating delivery of mechanical power via the internal combustion engine.

10. The hybrid powertrain system of claim 1, wherein the powertrain controller is configured for:

controlling the generator to charge the energy module while the internal combustion engine is in operation.

11. A method of operating a hybrid powertrain system of a planer, the method comprising:

coupling a rotor/cutter with an internal combustion engine;

coupling a generator with the internal combustion engine;

coupling an energy storage system including an energy module having at least one energy storage cell with the generator, wherein the energy storage system is configured to receive power from and be charged by the generator, coupling an electric motor with the rotor/cutter, wherein the electric motor is in electrical communication with the energy module; and controlling delivery of electrical power from the energy storage system to the rotor/cutter while controlling delivery of mechanical power from the internal combustion engine to the rotor/cutter.

12. The method of claim 11, wherein the generator is a motor-generator, the method further comprising:

coupling a pump drive with the motor-generator, wherein the pump drive is configured to receive power from the motor-generator.

13. The method of claim 12, comprising:

coupling the pump drive and the motor-generator in series.

14. The method of claim 12, comprising:

coupling the pump drive and the generator in parallel.

15. The method of claim 12, comprising:

controlling delivery of the electrical power to the pump drive while terminating delivery of the mechanical power via the internal combustion engine.

16. The method of claim 15, comprising:

receiving data representing a total power of the pump drive; and using the received data representing the total power of the pump drive to control delivery of the electrical power to the pump drive while terminating delivery of the mechanical power via the internal combustion engine.

17. The method of claim 11, comprising:

receiving data representing an output torque of the rotor/cutter; and using the received data representing the output torque of the rotor/cutter to control delivery of electrical power from the energy storage system to the rotor/cutter while controlling delivery of mechanical power from the internal combustion engine to the rotor/cutter.

18. A powertrain controller for a hybrid powertrain system of a planer, the hybrid powertrain system in electrical communication with an internal combustion engine and an energy storage system, the controller comprising:

one or more processors configured for:

controlling delivery of electrical power from the energy storage system to a rotor/cutter of the hybrid powertrain system while controlling delivery of mechanical power from the internal combustion engine to the rotor/cutter.

19. The powertrain controller of claim 18, wherein the powertrain controller is further configured for:

controlling delivery of the electrical power to a pump drive while terminating delivery of the mechanical power via the internal combustion engine.

20. The powertrain controller of claim 19, wherein the powertrain controller configured for:

controlling delivery of the electrical power to the pump drive while terminating delivery of the mechanical power via the internal combustion engine is configured for:

receiving data representing a total power of the pump drive; and using the received data representing the total power of the pump drive to control delivery of the electrical power to the pump drive while terminating delivery of the mechanical power via the internal combustion engine.

* * * * *